(12) United States Patent  
Becker

(10) Patent No.: US 9,251,342 B2  
(45) Date of Patent: Feb. 2, 2016

(54) EVALUATING DETECTABILITY OF INFORMATION IN AUTHORIZATION POLICIES

(75) Inventor: Moritz Becker, Cambridge (GB)

(73) Assignee: Microsoft Technology Licensing, LLC, Remond, WA (US)

( * ) Notice: Subject to any disclaimer, the term of this patent is extended or adjusted under 35 U.S.C. 154(b) by 297 days.

(21) Appl. No.: 13/194,349

(22) Filed: Jul. 29, 2011

(65) Prior Publication Data

US 2013/0031596 A1     Jan. 31, 2013

(51) Int. Cl.
| | |
|---|---|
| G06F 21/55 | (2013.01) |
| G06F 21/57 | (2013.01) |
| H04L 29/06 | (2006.01) |
| G06F 21/60 | (2013.01) |

(52) U.S. Cl.
CPC ............ *G06F 21/556* (2013.01); *G06F 21/577* (2013.01); *G06F 21/604* (2013.01); *H04L 63/1433* (2013.01); *H04L 63/20* (2013.01); *G06F 2221/2141* (2013.01)

(58) Field of Classification Search
CPC ... G06F 21/556; G06F 21/604; G06F 21/577; G06F 2221/2141; H04L 63/1433; H04L 63/20
USPC .................................................. 726/22–25
See application file for complete search history.

(56) References Cited

U.S. PATENT DOCUMENTS

2009/0193493 A1*   7/2009   Becker et al. ...................... 726/1  
2012/0047124 A1*   2/2012   Duan et al. ....................... 707/714

OTHER PUBLICATIONS

Becker, Moritz, "Information Flow in Credential Systems", in the 23rd IEEE Computer Security Foundations Symposium (CSF 2010), Jul. 17-19, 2010, pp. 171-185.*

Anderson (ed.), et al., "SAML 2.0 profile of XACML v2.0", retrieved on Sep. 19, 2011 at <<http://docs.oasis-open.org/xacml/2.0/access_control-xacml-2.0-saml-profile-spec-os.pdf>>, OASIS Standard, 2005, pp. 1-21.

Anderson (ed.), "Web Services Profile of XACML (WS-XACML) Version 1.0", retrieved on Sep. 19, 2011 at <<http://www.oasis-open.org/committees/download.php/21490/xacml-3.0-profile-webservices-spec-v1.0-wd-8-en.pdf>>, OASIS TC Working Draft, 2006, pp. 1-42.

(Continued)

*Primary Examiner* — Jeffrey D Popham  
(74) *Attorney, Agent, or Firm* — Steve Wight; Judy Yee; Micky Minhas

(57) ABSTRACT

Techniques for evaluating detectablity of confidential information stored in authorization policies are described. In an example, an authorization policy has a confidential property. The confidential property is defined by whether application of a test probe to the authorization policy results in the grant of access to a resource. A processor automatically determines whether at least one witness policy can be generated that is observationally equivalent to the authorization policy from the perspective of a potential attacker, but the application of the test probe to the witness policy generates an access denial result. In the case that such a witness policy can be generated, an indication that the confidential property cannot be detected using the test probe is output. In the case that such a witness policy cannot be generated, an indication that the confidential property can be detected using the test probe is output.

20 Claims, 6 Drawing Sheets

(56) References Cited

OTHER PUBLICATIONS

Becker, et al., "Cassandra: Flexible Trust Management, Applied to Electronic Health Records", retrieved on Sep. 19, 2011 at <<http://research.microsoft.com/pubs/76081/becker04cassandra-csfw2004.pdf>>, IEEE Computer Security Foundations Symposium, 2004, pp. 139-154.

Becker, et al., "Design and Semantics of a Decentralized Authorization Language", retrieved on Sep. 19, 2011 at <<http://research.microsoft.com/en-us/um/people/fournet/papers/design-and-semantics-of-a-decentralized-authorization-language-csf07.pdf>>, IEEE Computer Security Foundations Symposium, 2007, pp. 3-15.

Becker, "Information Flow in Credential Systems", retrieved on Sep. 19, 2011 at <<http://research.microsoft.com/pubs/122109/main.pdf>>, IEEE Computer Security Foundations Symposium, 2010, pp. 171-185.

Blaze, et al., "Decentralized Trust Management", retrieved on Sep. 19, 2011 at <<http://www.crypto.com/papers/policymaker.pdf>>, IEEE Symposium on Security and Privacy, 1996, pp. 164-173.

Bonatti, et al., "Foundations of Secure Deductive Databases", IEEE Transactions on Knowledge and Data Engineering, vol. 7, No. 3, Jun. 1995, pp. 406-422.

Bryans, et al., "Opacity generalised to transition systems", Springer, International Journal of Information Security, vol. 7, No. 6, 2008, pp. 421-435.

Ceri, et al., "What You Always Wanted to Know About Datalog (And Never Dared to Ask)", IEEE Transactions on Knowledge and Data Engineering, vol. 1, No. 1, 1989, pp. 146-166.

Cosmadakis, et al., "Decidable Optimization Problems for Database Logic Programs", ACM Symposium on Theory of Computing, 1988, pp. 477-490.

Cousot, et al., "Abstract Interpretation: A Unified Lattice Model for Static Analysis of Programs by Construction or Approximation of Fixpoints", ACM, Proceedings of SIGACT-SIGPLAN Symposium on Principles of Programming Languages, 1977, pp. 238-252.

Damianou, et al., "The Ponder Policy Specification Language", retrieved on Sep. 19, 2011 at <<http://www.doc.ic.ac.uk/~mss/Papers/Ponder-Policy01V5.pdf>>, Springer-Verlag (LNCS), Proceedings of Intl Workshop on Policies for Distributed Systems and Networks (POLICY), Bristol, UK, Jan. 2001, pp. 18-38.

Detreville, "Binder, a logic-based security language", retrieved on Sep. 19, 2011 at <<http://research.microsoft.com/pubs/69917/tr-2002-21.pdf>>, Microsoft Technical Report MSR-TR-2002-21, IEEE Symposium on Security and Privacy, 2002, pp. 105-113.

Fagin, et al., "Reasoning About Knowledge", retrieved on Sep. 19, 2011 at <<http://www.cs.rice.edu/~vardi/papers/book.pdf>>, MIT Press, 1995, pp. 1-75.

Farkas, et al., "The Inference Problem: A Survey", ACM, SIGKDD Explorations Newsletter, vol. 4, No. 2, 2002, pp. 6-11.

Goguen, et al., "Security Policies and Security Models", IEEE Symposium on Security and Privacy, vol. 12, 1982, pp. 11-20.

Gurevich, et al., "DKAL 2 | A Simplied and Improved Authorization Language", Microsoft Corporation, Microsoft Research, Technical Report MSR-TR-2009-11, Feb. 2009, pp. 1-26.

Gurevich, et al., "DKAL: Distributed-Knowledge Authorization Language", IEEE Computer Security Foundations Symposium (CSF), 2008, pp. 149-162.

Halpern, et al., "Secrecy in Multiagent Systems", retrieved at <<http://doi.acm.org/10.1145/1410234.1410239>>, ACM, Transactions on Information and System Security (TISSEC), vol. 12, No. 1, Article 5, Oct. 2008, pp. 1-47.

Jajodia, et al., "Inference Problems in Multilevel Secure Database Management Systems", retrieved on Sep. 19, 2011 at <<http://www.acsac.org/secshelf/book001/24.pdf>>, Information Security: An Integrated Collection of Essays, Essay 24, 1995, pp. 570-584.

Jim, "SD3: a trust management system with certified evaluation", IEEE Proceedings of Symposium on Security and Privacy, 2001, pp. 106-115.

Li, et al., "Design of a Role-based Trust-management Framework", IEEE Symposium on Security and Privacy, 2002, pp. 114-130.

Mazare, "Using Unification for Opacity Properties", retrieved on Sep. 19, 2011 at <<http://www-eva.imag.fr/bib/EVA-TR16.pdf>>, Proceedings of Workshop on Issues in the Theory of Security (WITS), 2004, pp. 165-176.

Moses (ed.), "eXtensible Access Control Markup Language (XACML) Version 2.0", retrieved on Sep. 19, 2011 at <<http://docs.oasis-open.org/xacml/2.0/access_control-xacml-2.0-core-spec-os.pdf>>, OASIS standard, core specification, 2005, pp. 1-141.

Muggleton, et al., "Inductive Logic Programming: Theory and Methods", The Journal of Logic Programming, vol. 19, No. 20, 1994, pp. 629-679.

Sabelfeld, et al., "Language-Based Information-Flow Security", retrieved on Sep. 19, 2011 at <<http://www.cse.chalmers.se/~andrei/jsac.pdf>>, IEEE Journal on Selected Areas in Communications, vol. 21, No. 1, Jan. 2003, pp. 5-19.

Ullman, "Implementation of Logical Query Languages for Databases", ACM, Transactions on Database Systems (TODS), vol. 10, No. 3, 1985, pp. 289-321.

Winsborough, et al., "Automated Trust Negotiation", retrieved on Sep. 19, 2011 at <<http://isrl.cs.byu.edu/pubs/discex2000.pdf>>, DARPA Information Survivability Conference and Exposition, vol. 1, 2000, pp. 1-15.

Winsborough, et al., "Safety in Automated Trust Negotiation", ACM, Transactions on Information and System Security (TISSEC), vol. 9, No. 3, Aug. 2006, pp. 352-390.

Zdancewic, et al., "Robust Declassification", IEEE Computer Security Foundations Workshop (CSF), 2001, pp. 15-23.

* cited by examiner

EVALUATING DETECTABILITY OF INFORMATION IN AUTHORIZATION POLICIES

BACKGROUND

Authorization policies are used to control access to security-critical services in distributed environments such as computer networks. Such authorization policies can be defined using associated authorization languages, which provide flexibility and expressiveness in the policy specification. These languages allow the authorization policy to be written explicitly as a list of declarative rules.

Requests for access to security-critical services are received at a reference monitor, which is a service serving requests from user terminals. The reference monitor queries an authorization node executing the authorization policy. Access for the user is granted only if the authorization node evaluating the policy succeeds in proving that the request complies with the local policy.

As authorization languages become more expressive, the risk of attack through complex, carefully formulated requests increases. For example, credential-based (also called "claims-based") policy languages for authentication/authorization are becoming increasingly widely used. Such languages subscribe to what is known as the trust management principle: authorization decisions are based on the local policy in union with a (potentially empty) set of supporting credentials (containing assertions) submitted by the requester. Access requests are mapped to queries, so that access is granted if the corresponding query succeeds when evaluated in the context of the policy and the submitted credentials.

If the supporting credentials exceed a certain level of expressiveness, it may become possible for attackers to infer knowledge about secret facts stored in the local policy, just by submitting credentials and observing the response to a legitimate query. Such attacks are known as "probing attacks". It is difficult to determine whether a confidential fact within an authorization policy is vulnerable to such a probing attack. Some authorization languages do not allow submitted credentials to contain any conditions, and thus avoid this type of attack. However, this restriction on expressiveness of the authorization language is too high a price to pay in general.

The embodiments described below are not limited to implementations which solve any or all of the disadvantages of known authorization systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Techniques for evaluating detectablity of confidential information stored in authorization policies are described. In an example, an authorization policy has a confidential property. The confidential property is defined by whether application of a test probe to the authorization policy results in the grant of access to a resource. A processor automatically determines whether at least one witness policy can be generated that is observationally equivalent to the authorization policy from the perspective of a potential attacker, but the application of the test probe to the witness policy generates an access denial result. In the case that such a witness policy can be generated, an indication that the confidential property cannot be detected using the test probe is output. In the case that such a witness policy cannot be generated, an indication that the confidential property can be detected using the test probe is output.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
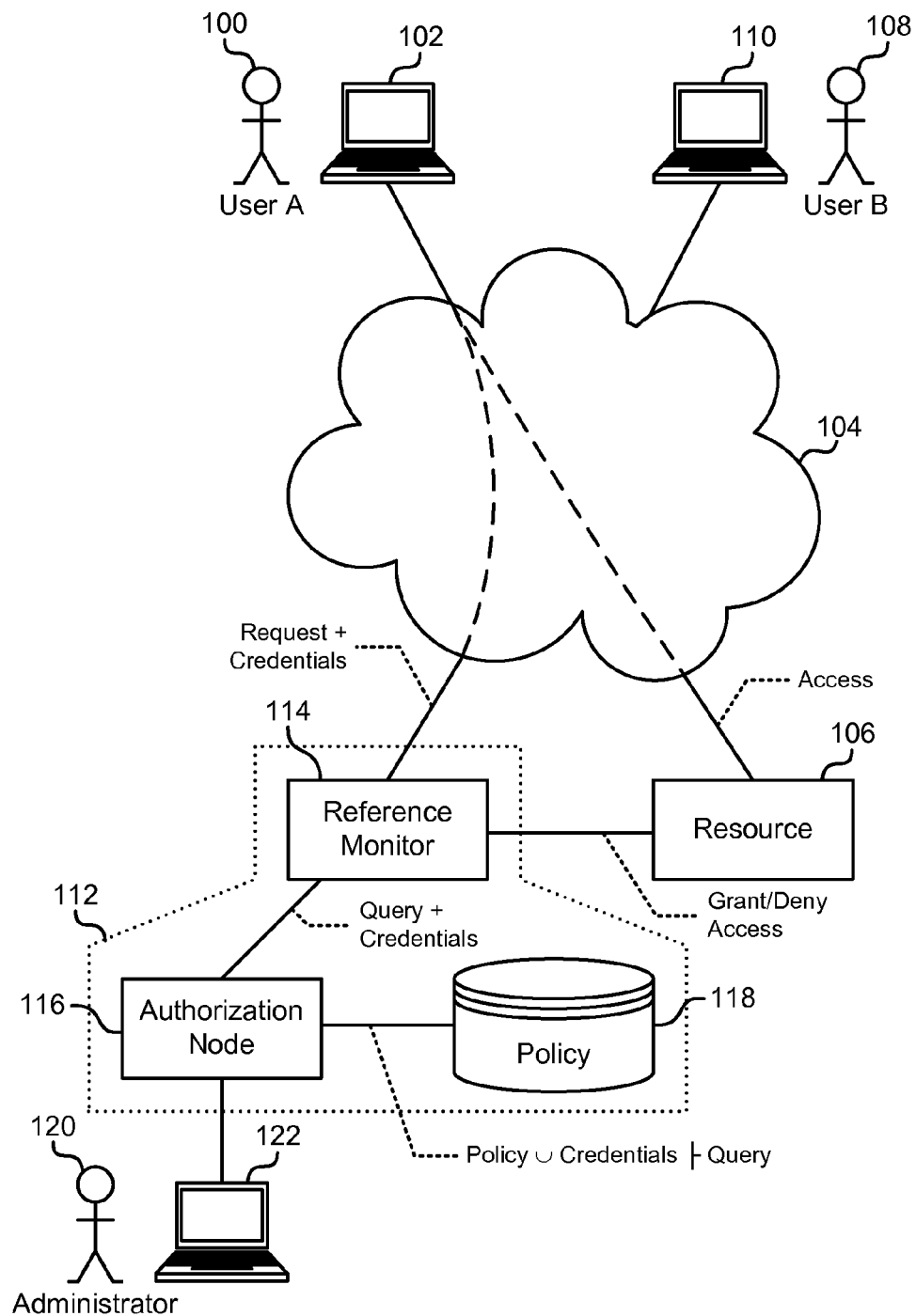
FIG. 1 illustrates a schematic diagram of an authorization system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in authorization systems using the Datalog or SecPAL languages, this is provided as an example and not a limitation. As those skilled in the art will appreciate, the present examples are suitable for application in a variety of different types of authorization systems using one or more different authorization languages.

When authorization languages are expressive enough, the languages can be used by attackers to infer secrets from within authorization policies using probing attacks. This type of attack can be illustrated with a hypothetical example. Imagine a "Service" (for example run at a government agency) with a policy that gives parking permissions to principals that consent to the relevant terms and conditions. The Service can therefore be legitimately used by principals to request permission to park in a car park. However, the policy additionally contains other confidential facts unrelated to parking that are used by other services. For example, the policy can also hold the identities of secret agents (e.g. working at the government agency).

An adversary, called Alice, submits a request for a parking permission to the Service, and together with the request submits two self-issued credentials containing the following assertions to the Service:

(1) Alice says Alice consents to parking rules if Bob is a secret agent (2) Alice says Service can say Bob is a secret agent The second credential (Alice says Service can say Bob is a secret agent) is a delegation of authority assertion, which delegates the assertion of the fact (whether Bob is a secret agent) to the Service. This is written here in the authorization language SecPAL, which uses "can say" statements for delegation of authority. This type of statement can be readily converted to other languages.

If the access request, corresponding to a query of the form <Service says Alice can park>, is granted, then Alice could infer from this observation that Service says Bob is a secret agent. This fact, together with credential (2), implies that Alice also says that Bob is a secret agent, hence the condition of (1) would be satisfied and Alice's parking consent is valid, which in turn makes the query succeed.

However, a closer look reveals that the secret agent fact cannot be inferred with certainty, as there are two alternative valid explanations that would lead to the same observation: Service says Alice can park, and Service says Alice consents to parking rules. However, the attack can be made more precise by Alice conducting a second probe, again with the same request (and thus the same query), but submitting only the first of the two credentials above. If this second probe yields a negative response, Alice can be certain that Bob is indeed a secret agent (according to Service), for then she knows that (2) is essential in making the query succeed.

A similar attack can be mounted in order to check for the absence of any secret agent fact. Clearly, it is highly undesirable for the adversary Alice to find out if Bob is a secret agent just by requesting a parking permission.

Such attacks make it possible for attackers to infer knowledge about secret facts stored in a local policy, just by submitting credentials (probes) and observing the response to a legitimate query, even though the query has nothing to do with the fact. Successive probing through credentials effectively provides a covert channel for confidential facts, and this type of attack works with a wide range of modern policy systems.

In general, such attacks work in trust management environments because services have policies, parts of which may be confidential. Policies can be queried by external principals (though not all queries may be available to all principals). Principals can submit credentials to support the query, and the query is evaluated against the local policy in union with the set of submitted credentials. If the policy language is expressive enough to support credential-based authorization, and credentials can contain such assertions, then these can be manipulated to infer the confidential facts as demonstrated above.

Reference is now made to FIG. 1, which illustrates an example authorization system in which probing attacks can be made. In normal use, the system is used to provide one or more entities with access to a secured resource. In the example of FIG. 1, a first entity 100 ("User A") operates a first user terminal 102 connected to a communication network 104. The communication network 104 can comprise, for example, a wide area network such as the internet, or a local area network. The first entity 100 wishes to gain access to a resource 106 connected to the communication network 104. However, the resource 106 is secured such that the first entity 100 is authorized before being able to access the resource 106. The resource 106 can be, for example, a document stored on a server, data stored in a database, a webpage, physical access to a building or place, an executable program, processing resources or another communication network.

FIG. 1 also shows a second entity 108 ("User B") operating a second user terminal 110 connected to the communication network 104. The second entity 108 can also request access to the secured resource 106. Note that whilst FIG. 1 only illustrates two entities, any number of entities can be connected to the communication network 104 and request access to the secured resource 106.

Authorization to access the resource 106 is provided by an authorization system 112. The authorization system 112 comprises a reference monitor 114, an authorization node 116 (also known as a policy engine) and an authorization policy 118.

The reference monitor 114 is connected to the communication network 104. The reference monitor 114 is a service arranged to serve access requests from the user terminals over the communication network 104. In other words, the reference monitor 114 operates as a front-end to the authorization system 112 and mediates the requests from the entities for access to the resource 106.

The authorization node 116 is connected to the reference monitor 114. The authorization node 116 is executing (or in communication with) an authorization policy 118. The authorization policy 118 comprises a list of rules for determining whether to grant an entity access to the resource 106, and under what conditions. The authorization policy 118 is defined using an authorization query language, such as, for example, SecPAL, XACML, Binder or RT. The authorization policy 118 is defined and maintained by an administrator 120 operating an computing device 122 that can communicate with the authorization node 116 (directly or via the communication network 104).

Note that the reference monitor 114, authorization node 116 and the authorization policy 118 can be implemented on physically separate network elements. Alternatively, they can be implemented on common network elements (e.g. all on the authorization node 116). However, the reference monitor 114 and the authorization node 116 are separate functional elements, and can be implemented in differing programming languages. Note that, in alternative examples, the first entity 100 can be directly interacting with the hardware that is executing the reference monitor 114, in which case network 104 and user terminal 102 need not be present.

Figure 2:
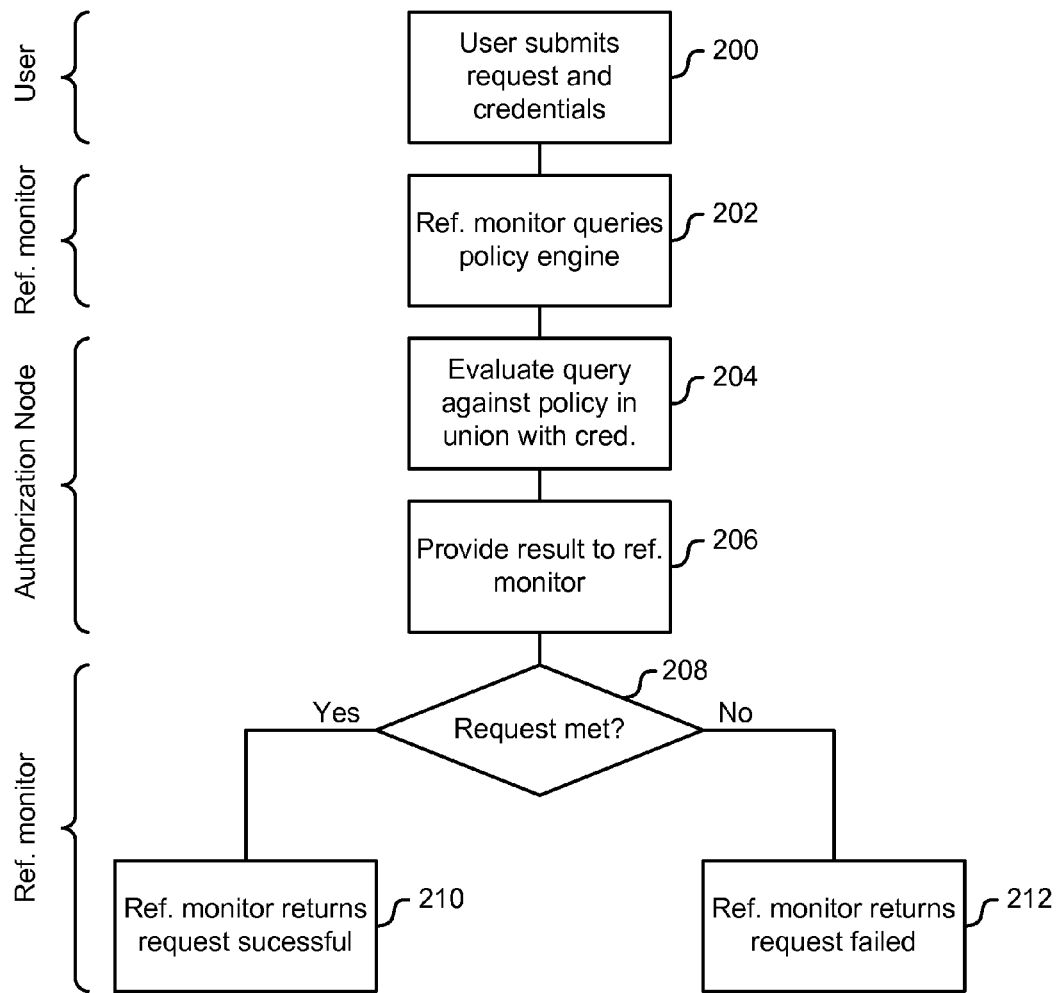
FIG. 2 illustrates a flowchart of a process for evaluating a request and supporting credentials.

Reference is now made to FIG. 2, which illustrates a flowchart of a process for evaluating a request and supporting credentials in the system of FIG. 1. If the first entity 100 is using the system legitimately (i.e. not for a probing attack), then the first entity 100 requests access to the resource 106 by using the user terminal 102 to submit 200 a request message to the reference monitor 114. The request can also be accompanied by legitimate supporting credentials, which can optionally comprise delegation of authority assertions. Responsive to receiving the request message, the reference monitor 114 formulates a query 202, and sends the query and the supporting credentials to the authorization node 116 to ask whether the first entity 100 is to be granted access. The query to the authorization node 116 can comprise data regarding the requested resource, the type of action that the user wishes to perform on the resource, the requesting entity and/or the user terminal.

The authorization node 116 evaluates 204 the query in accordance with the authorization policy 118 and the supporting credentials. The authorization policy 118 comprises one or more rules which are evaluated in light of the query and the credentials to determine whether to authorize the user. To do this, the query is evaluated against the authorization policy 118 in union with the supporting credentials. More formally, the authorization node evaluates:

$$P \cup C \vdash Q$$

Where: P is the policy, C is the set of credentials, and Q is the query. The symbol ⊢ is a decision relation, and denotes whether the query is deducible from the policy in light of the credentials.

The result of the evaluation of the query is provided 206 to the reference monitor 114 by the authorization node 116. The reference monitor 114 then determines 208 from the result whether the request was met. If so, the reference monitor returns 210 a request successful message to the first entity 100 and can then grant access to the resource 106 for the first entity 100. Alternatively, if the request was not met, the reference monitor returns 212 a request failed message to the first entity 100 and denies access to the resource 106 for the first entity 100.

If the first entity 100 is not a legitimate user of the system, but is an attacker, then the first entity 100 can utilize the process of FIG. 2 to submit requests for access to the resource 106, even though he has no interest in accessing the resource 106. Instead, the first entity 100 wants to use the returned results to infer secret facts from within the policy 118 that may be unrelated to the resource 106.

To do this, the first entity 100 again submits a request for access to the resource 106 along with supporting credentials. The supporting credentials contain assertions that are selected to enable the inference of facts from the policy.

The request is converted to a query by the reference monitor 114, as before, and provided to the authorization node 116 together with the supporting credentials. The authorization node 116 evaluates the query as if it were legitimate, by evaluating it against the authorization policy 118 in union with the supporting credentials. The result is provided back to the first entity 100 via the reference monitor 114. The first entity 100 then uses the result to infer facts from the policy, or generates new requests that can be sent to reference monitor 114 to combine with the results and infer facts.

Probing attacks therefore present a serious issue in trust management systems, as policies commonly contain confidential information, and it takes little effort to conduct a probing attack with legitimately collected and self-issued credentials. At the same time, it is non-trivial to see, in more involved examples, if a piece of information can be detected through probing or not. It is therefore useful to have an automated method for verifying non-detectability (also known as opacity) of information in credential systems. Presented below is an automated technique for determining whether a piece of information in a policy is detectable or opaque.

The algorithm below for checking opacity is presented using the example of policies written in Datalog, which is the basis of many existing policy languages. In other examples, other languages can also be used. The algorithm is not only sound, but also complete and terminating: if it fails to prove opacity (in which case failure is reported in finite time), then the given fact is provably detectable.

It can be seen that the probing attacks are interested in the result of whether a given probe is granted access by an authorization policy (i.e. holds in the policy). This result is a property of the authorization policy, which may be used to infer confidential information. The technique presented herein is based on the concept that a property (whether a probe is granted access) is opaque (i.e. not detectable) in a policy if there exists some other policy that behaves in the same way as the policy with regards to the attackers probes, but in which the property does not hold. If the property is opaque, the algorithm constructs such a "witness policy". In some examples, the algorithm can iteratively construct a finite sequence of such witnesses that subsumes the generally infinite set of all witnesses.

Because the algorithm constructs the witness policies, they can be assigned probabilities, or a security analyst can interactively discard unlikely witnesses. The final result can therefore be interpreted as a degree of likelihood of the property being opaque. Several optimization methods are also presented for cutting the computational cost by pruning the search space.

In the example language of Datalog, a clause is of the form $P_0 \leftarrow P_1, \ldots, P_n$, where $n \geq 0$ and $P_i$ are atoms. The head of the clause is to the left of the arrow, and the atoms to the right of the arrow form the body. The commas separating the body atoms represent the AND operator, such that the head is true if each of the body atoms are true. The head of a clause a is denoted hd(a) and bd(a) denotes the body. Given a set of clauses A, hds(A) denotes the atom set $\{hd(a)|a \in A\}$. A policy can be defined as a set of Datalog clauses, and a credential can be defined as a Datalog clause. A query $\phi$ is either true, false or a ground (i.e., variable-free) boolean formula (i.e., involving connectives ¬, ∧ and ∨) over atoms P. Qry denotes the set of all queries. A query $\phi$ is evaluated with respect to a set A of assertions. For atomic $\phi = P$, we define that A⊢P holds iff there exists a ground (i.e., variable-free) instance $P \leftarrow \vec{P}$ of some clause in A and A⊢$P_i$ for all $P_i \in \vec{P}$. The non-atomic cases are defined in the standard way, e.g. A⊢¬$\phi$ iff A⊬$\phi$.

In the following a probe $\pi$ is defined as a pair $\langle A, \phi \rangle$ containing a set A of ground (i.e., variable-free) credentials and a ground query $\phi$. The probe $\pi$ can be applied to a policy $A_0$, and if the probe $\pi$ leads to an access grant result, then it is said that the probe is positive in policy $A_0$, and this is denoted $A_0 \vdash \pi$. Conversely, if the probe $\pi$ leads to an access denial result, then it is said that the probe is negative in policy $A_0$, and this is denoted $A_0 \not\vdash \pi$. As noted above a probe $\pi$ is positive in $A_0$ (i.e. $A_0 \vdash \pi$) if and only if the query $\phi$ is deducible from the policy in union with the credentials, i.e. $A_0 \cup A \vdash \phi$.

Figure 3:
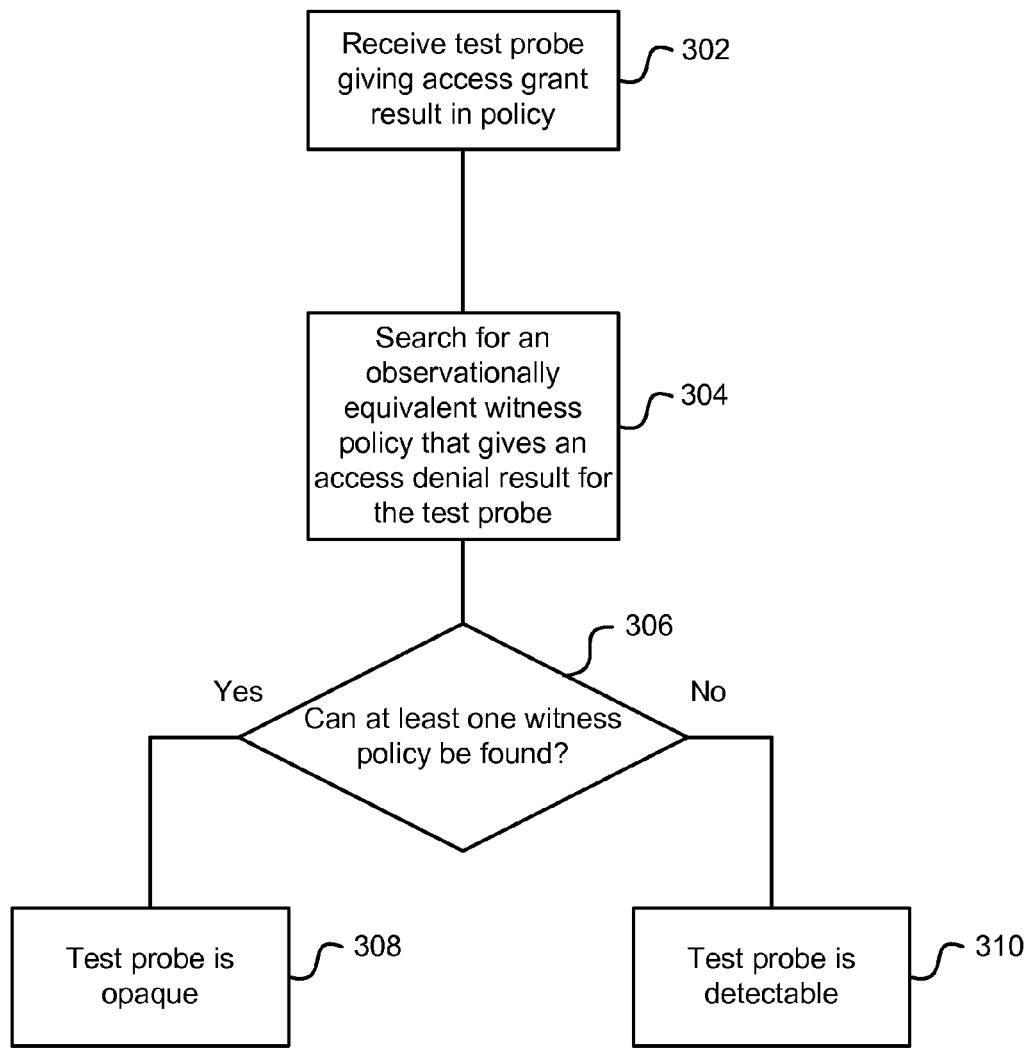
FIG. 3 illustrates a flowchart of a process for evaluating whether or not a confidential property is detectable in a policy through probing.

Reference is now made to FIG. 3, which illustrates a flowchart of a process for evaluating whether or not a confidential property is detectable in a policy through probing (which can also be expressed as whether a probe is opaque or detectable). Firstly a test probe is selected and/or received 302. This test probe $\pi$ gives an access grant result in a policy $A_0$ ($\pi$ is positive in policy $A_0$), i.e. $A_0 \vdash \pi$. Note that if $\pi$ were negative, $\pi$ would trivially be opaque (not detectable) anyway. The test probe comprises a set A of credentials and a query $\phi$.

A search 304 is performed for a witness policy, denoted $A'_0$, that is observationally equivalent to the policy $A_0$, but the application of the test probe to the witness policy generates an access denial result. In other words, the test probe $\pi$ is negative in the witness policy $A'_0$, i.e. $A'_0 \not\vdash \pi$.

A witness policy $A'_0$, is observationally equivalent to the policy $A_0$ if, from the perspective of an external party such as an attacker, the two policies appear identical. In some examples, a policy can have a visible portion and a private portion, wherein the visible portion forms a part of the policy that can be seen by an attacker. Two policies can be said to be alike (denoted $A_0 \simeq A'_0$) if their visible portions are equal, i.e. they publicly look the same. The visible portion of policy $A_0$ is denoted Visible($A_0$). Furthermore, an attacker may also have a set of available probes that are available to apply to the policy. These are denoted Avail. The analysis is therefore relative to a given attacker, which is specified by the set of available probes, Avail, and by Visible. Typically, an attacker can use credentials they own or can create for the credential part of their probes, and the public queries supported by the service for the query part of their probes. Two policies can be said to be observationally equivalent (denoted $A_0 \equiv A'_0$) if they are alike (have the same visible portion) (denoted $A_0 \simeq A'_0$)

and every available probe (in Avail) that is positive in one policy is also positive in the other policy. More formally, this can be expressed as:

$A_0 \equiv A'_0$ iff

1. $A_0 \simeq A'_0$ and
2. $\forall \pi \in \text{Avail}, A_0 \vdash \pi \Leftrightarrow A'_0 \vdash \pi$ If it is determined 306 that at least one witness policy $A'_0$, can be found that is observationally equivalent to the policy $A_0$ and makes the test probe negative, then the result that the test probe (i.e. the property) is opaque (i.e. non-detectable) in the policy is output 308. Conversely, if it is determined 306 that no witness policy $A'_0$, can be found that is observationally equivalent to the policy $A_0$ and makes the test probe negative, then the result that the test probe (i.e. the property) is detectable in the policy is output 310.

This can be expressed more formally as follows:

A probe $\pi$ is detectable in $A_0$ iff $\forall A'_0$: $A_0 \equiv A'_0 \Rightarrow A'_0 \vdash \pi$.

A probe $\pi$ is opaque in $A_0$ iff it is not detectable, or equivalently, iff $\exists A'_0 : A_0 \equiv A'_0 \land A'_0 \nvdash \pi$.

Figure 4:
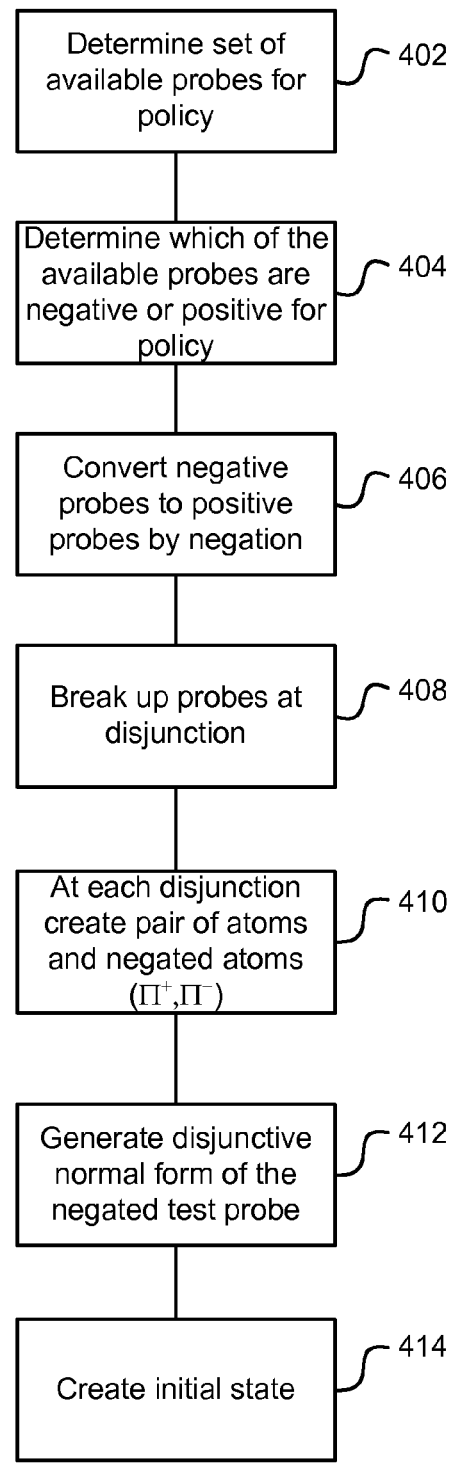
FIG. 4 illustrates a flowchart of a process for generating a set of initial states for testing detectability.
Figure 5:
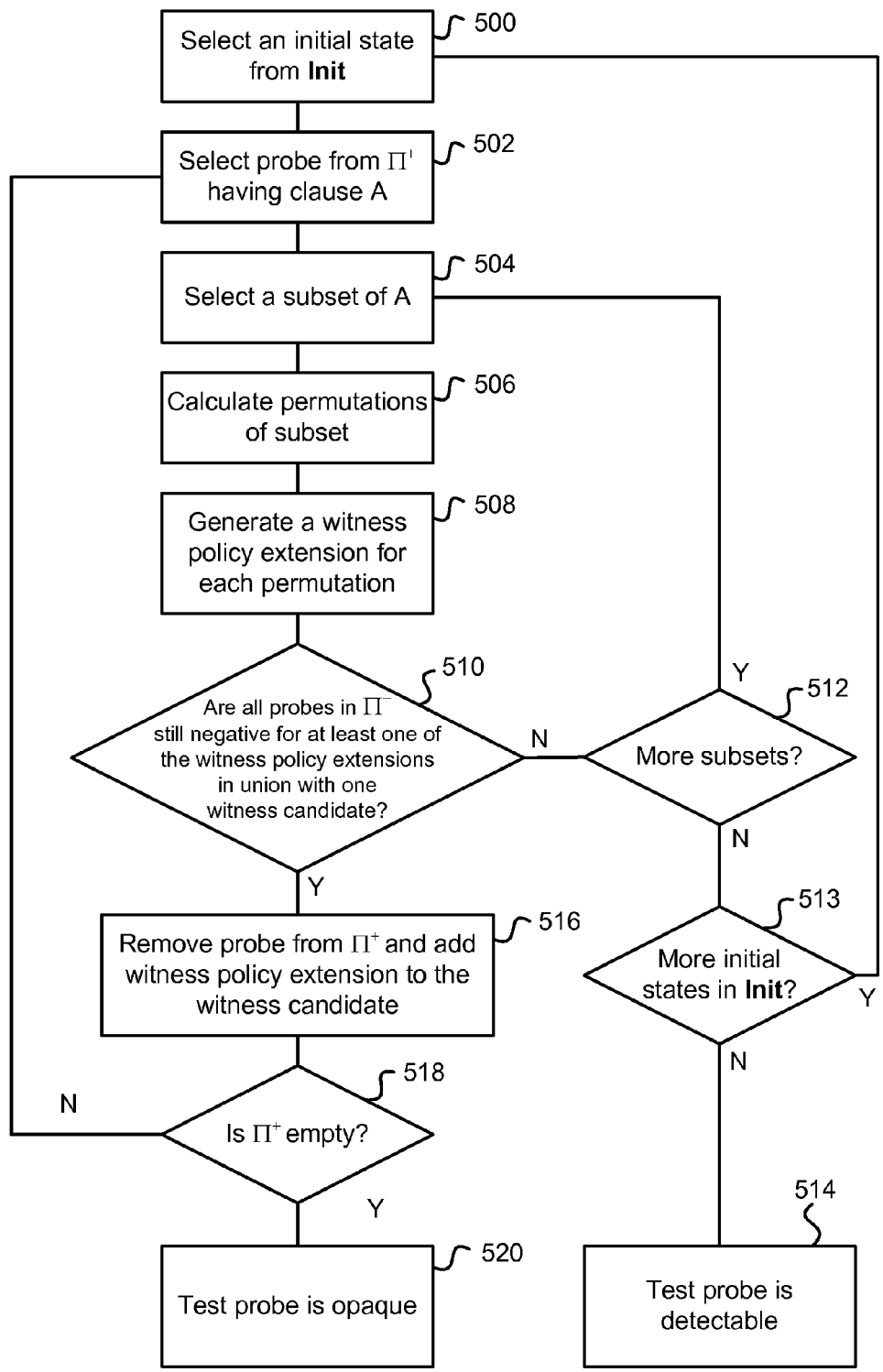
FIG. 5 illustrates a flowchart of a process for determining detectability from the set of initial states.

Reference is now made to FIGS. 4 and 5, which illustrate an algorithm for automatically determining opacity of a probe. The algorithm of FIGS. 4 and 5 can be executed on a computing device (such as computing device 122 of FIG. 1) in order to provide an output to an administrator/analyst of a policy whether a property is opaque or detectable. Further detail on the computing device for executing the algorithm is provided with reference to FIG. 6.

The algorithm for automatically determining opacity of a probe is presented in two parts. The first part, in FIG. 4, generates a set of initial states, and the second part, in FIG. 5, starts from any initial state and searches for one or more witness policies in order to determine opacity (if a witness policy can be found) or detectability (if no witness policy exists).

In summary, the initialization process of FIG. 4 generates a triple of the form $\langle \Pi^+, \Pi^-, A_1 \rangle$, where $\Pi^+$ is a set of probes that have to be positive in the witness policy, $\Pi^-$ is a set of probes that have to be negative in the witness policy, and $A_1$ is an initial witness policy candidate. In other words, this generates a set of positive probes that generate an access grant result for the authorization policy and a set of negative probes that generate an access denied result for the authorization policy.

The initialization process determines 402 (or is provided) a set of available probes for the policy $A_0$ under test. As noted above, the available probes are denoted Avail. It is then determined 404 which of these available probes are positive and which are negative when applied to the policy $A_0$ under test.

The probes that are negative in policy $A_0$ are converted 406 into positive probes by negation. This can be performed because if $A_0 \nvdash \pi$ (the probe is negative) then this is equivalent to $A_0 \vdash \neg \pi$. In other words, a negated negative probe is positive in the policy. For a probe $\pi$ defined as a pair $\langle A, \phi \rangle$ containing a set A of credentials and a query $\phi$, the negation of this probe $(\neg \pi)$ is given by the pair $\langle A, \neg \phi \rangle$ comprising the set A of credentials and the negation of the query $\neg \phi$.

The positive probes and the negated negative probes from Avail are broken up 408 at disjunctions to form disjuncts of atoms and negated atoms. In other words, the probes are broken up into simpler probes where OR operators are present in the probe queries. For example, consider a probe $\pi = \langle A, \phi_1 \lor \phi_2 \rangle \in$ Avail that is positive in $A_0$. This probe has a disjunction (OR operator) in the query. Recall that it is the ultimate goal of the algorithm to find a witness policy $A'_0$; such that $A'_0 \vdash \pi$ holds, or, in other words, $A'_0 \cup A \vdash \phi_1 \lor \phi_2$. This is equivalent to either finding an $A'_0$ such that $A'_0 \vdash \langle A, \phi_1 \rangle$, or finding one such that $A'_0 \vdash \langle A, \phi_2 \rangle$. A disjunction in the query of a positive probe in Avail therefore corresponds to a branch in the search for $A'_0$. By splitting up the queries at disjunctions in this way, complex queries are broken down to atomic ones, containing either atoms or negated atoms. This is similar to finding the disjunctive normal form of the queries (as described in more detail below).

For each disjunction in the probes, a pair of sets denoted $\langle \Pi^+, \Pi^- \rangle$ of positive and negative atoms is created 410. For each disjunctive combination of probes the atoms are added to a set $\Pi^+$ and the negated atoms are added to a set $\Pi^-$.

The conversion of negative probes, the breaking up at disjunctions, and creation of sets of positive and negative atoms (406 to 410 in FIG. 4 above) can be illustrated with the following explanatory example. Suppose the available probes for a policy comprise two probes $\pi_1$ and $\pi_2$, i.e. Avail=$\{\pi_1, \pi_2\}$, where $\pi_1 = \langle A_1, \neg p \lor q \rangle$ and $\pi_2 = \langle A_2, \neg p \lor q \rangle$. Note that the queries for both probes have OR operators. Suppose further that $\pi_1$ is positive in policy $A_0$, i.e. $A_0 \vdash \langle A_1, \neg p \lor q \rangle$), but $\pi_2$ is negative in policy $A_0$, i.e. $A_0 \nvdash \langle A_2, \neg p \lor q \rangle$. Probe $\pi_2$ is converted to a positive probe by negating the query, hence $A_0 \vdash \langle A_2, p \neg q \rangle$. Note that the converted probe $\pi_2$ no longer contains a disjunction as a result of this negation, and hence only one disjunction (from $\pi_1$) remains in the available probes. Probe $\pi_1$ can therefore be broken into two separate probes $\langle A_1, \neg p \rangle$ and $\langle A_1, q \rangle$ at the OR statement. This leaves the broken up Avail with two groups $\{\langle A_1, \neg p \rangle, \langle A_2, p \neg q \rangle\}$ and $\{\langle A_1, q \rangle \langle A_2, p \neg q \rangle\}$. Because there is one disjunction, two pairs $\langle \Pi^+, \Pi^- \rangle$ are created (one for each of the two broken up groups in Avail). From the first group, there is only one non-negated atomic query $\langle A_2, p \rangle$, so this is added to the first $\Pi^+$, and there are two negated atomic queries, resulting in $\langle A_1, p \rangle, \langle A_2, q \rangle$ in the first $\Pi^-$. From the second group, there are two non-negated atomic queries $\langle A_1, q \rangle, \langle A_2, p \rangle$ added to the second $\Pi^+$, and one negated atomic query $\langle A_2, q \rangle$ added to the second $\Pi^-$.

This operation to convert negative probes, break up probes at disjunctions, and create sets of positive and negative atomic queries (406 to 410 in FIG. 4 above) can be implemented as a function denoted herein as $\text{flatten}_{A_0}$. Therefore, the function $\text{flatten}_{A_0}$ applied to Avail first performs the described conversion of negative probes into equivalent positive ones. It then splits each probe into disjuncts of atomic and negated atomic queries. Finally, it produces a cartesian product of all these disjuncts that keeps the atomic and negated queries apart. The output of $\text{flatten}_{A_0}$ is the set of pairs of disjunction-free probe sets; each such pair $\langle \Pi^+, \Pi^- \rangle$ corresponds to a disjunctive search branch. The problem of finding a policy $A'_0$, that is observationally equivalent to $A_0$ can then be reduced to finding an $A'_0$, and picking a pair $\langle \Pi^+, \Pi^- \rangle \in \text{flatten}_{A_0}(\text{Avail})$ such that all probes in $\Pi^+$ are positive, and all probes in $\Pi^-$ are negative in $A'_0$.

The definition of the $\text{flatten}_{A_0}$ function can be expressed more formally as below. In the following, $\text{dnf}(\phi)$ denotes the disjunctive normal form of a query $\phi$, represented as a set of pairs $(S^+, S^-)$ of sets of atoms. For instance, if $\phi = (p \land q \neg s) \lor (\neg p \neg q \land s)$, then $\text{dnf}(\phi) = \{(\{p, q\}, \{s\}), (\{s\}, \{p, q\})\}$. If $\Pi$ is a set of probes, then $\text{flatten}_{A_0}(\Pi)$ is a set of pairs $\langle \Pi^+, \Pi^- \rangle$ defined inductively as follows:

$\text{flatten}_{A_0}(\emptyset) = \{(\emptyset, \emptyset)\}$.

$\text{flatten}_{A_0}(\Pi \cup \{\langle A, \phi \rangle\}) = \{(\Pi^+, \Pi^-) | \exists (S^+, S^-) \in \text{dnf}(\tilde{\phi}), (\Pi_0^+, \Pi_0^-) \in \text{flatten}_{A_0}(\Pi):$ $\Pi^+ = \Pi_0^+ \cup \{\langle A, \land S^+ \rangle\}$ and $\Pi^- = \Pi_0^- \cup \{\langle A, \lor S^- \rangle\}$, where $\tilde{\phi} = \phi$ if $A_0 \vdash \langle A, \rangle$, and $\tilde{\phi} = \neg \phi$ otherwise.

Returning to FIG. 4, the test probe, denoted $\pi_0$, is negated, and the disjunctive normal form of the negated test probe is generated 412. This is performed because, apart from the observational equivalence $A_0 \equiv A'_0$, opacity of $\pi_0$ in $A_0$ additionally requires that $\pi_0$ be negative in $A'_0$. For example, if $\pi_0 = \langle A, \phi \rangle$, this is equivalent to finding a pair $(S^+, S^-) \in dnf(\neg \phi)$ (with dnf defined as above) such that $A'_0 \vdash \langle A, \wedge S^+ \rangle$ and $A'_0 \not\vdash \langle A, \vee S^- \rangle$. In other words, the disjunctive normal form function finds a set of pairs of test atoms and negated test atoms from the negated test probe.

The set of initial states can then be created 414. As noted above, an initial state is a triple of the form $\langle \Pi^+, \Pi^-, A_1 \rangle$, where $\Pi^+$ is a set of probes that have to be positive in the witness policy, $\Pi^-$ is a set of probes that have to be negative in the witness policy, and $A_1$ is an initial witness policy candidate. $\Pi^+$ is formed by adding the set of positive test atoms from a member of dnf($\neg \phi$) to the set of positive atoms derived from the available probes, and $\Pi^-$ is formed by adding the set of negative test atoms from the same member of dnf($\neg \phi$) to the set of negative atoms derived from the available probes. Therefore, if the output from the flatten$_{A_0}$ (Avail) function contains a pair $(\Pi_0^+, \Pi_0^-)$, and the output of dnf($\neg \phi$) contains a pair $(S^+, S^-)$ for the test probe $\pi_0 = \langle A, \phi \rangle$, this gives rise to an initial state $\langle \Pi^+, \Pi^-, A_1 \rangle$ where $\Pi^+ = \Pi_0^+ \cup \{\langle A, \wedge S^+ \rangle\}$, and $\Pi^- = \Pi_0^- \cup \{\langle A, \vee S^- \rangle\}$.

Furthermore, from the alikeness condition $A_0 \simeq A'_0$, any witness must contain Visible($A_0$). Hence Visible($A_0$) is selected as the initial witness policy candidate $A_1$. In summary, each combination of pairs $(\Pi_0^+, \Pi_0^-)$ in flatten$_{A_0}$ (Avail) with pairs $(S^+, S^-)$ in dnf($\neg \phi$) thus gives rise to an initial state:

$$\langle \Pi_0^+ \cup \{\langle A, \wedge S^+ \rangle\}, \Pi_0^- \cup \{\langle A, \vee S^- \rangle\}, \text{Visable}(A_0) \rangle$$

The set of all such initial states is denoted Init.

Having determined the set of initial states, the problem of proving opacity of test probe $\pi_0$ in policy $A_0$ can be reduced to constructing a witness policy $A'_0$ such that all probes in $\Pi^+ = \Pi_0^+ \cup \{(\langle A, \wedge S^+ \rangle)\}$ are positive, and all probes in $\Pi^- = \Pi^- \cup \{\langle A, \vee S^- \rangle\}$ are negative $A'_0$. If such an $A'_0$, exists, it can be said that $A'_0$, is a witness for the opacity of $\pi_0$ in policy $A_0$.

Reference is now made to FIG. 5, which illustrates a flowchart of a process for using an initial state in Init to search for whether one or more witness policies can be found. In summary, the probe search of FIG. 5 takes an initial state $\langle \Pi^+, \Pi^-, A_1 \rangle$ in Init and considers and discards one positive probe from $\Pi^+$ at a time, adds a set of clauses to the witness policy candidate, and confirms whether all the probes in $\Pi^+$ are still negative in the updated witness candidate. This is performed until either all the positive probes in $\Pi^+$ have been discarded, such that a so-called final state of the form $\langle \emptyset, \Pi^-, A'_0 \rangle$ is reached (in which case a witness policy $A'_0$ has been found implying opacity), or no such state can be reached. In the latter case, the next initial state in Init is considered in the same manner. If no final state is reached after considering all initial states in Init, the test probe $\pi_0$ is found to be detectable in policy $A_0$.

An initial state from the set Init is firstly selected 500. A probe from the set of positive probes $\Pi^+$ is selected 502 from this selected initial state. The selected probe is of the form $\langle A, \phi \rangle$, and hence has credential set A. Like the policy $A_0$ itself, credential sets such as A comprise one or more clauses.

The algorithm considers all the subsets of the clauses in A as well as A itself, and a clause set $\tilde{A} \subseteq A$ is selected 504 for consideration. All permutations of the clauses in the selected clause set $\tilde{A}$ are calculated 508. In other words, each possible arrangement of the clauses in the clause set is found. The function for determining the permutation of clauses is denoted perms($\tilde{A}$).

For each of these permutations, a witness policy extension is generated. A witness policy extension, denoted A", is a set of clauses that can be added to the current witness policy being built up (known as the witness policy candidate A', which is initialized to Visible($A_0$) for the first iteration through the algorithm as noted above), such that the selected positive probe remains positive. In other words, the witness policy extension is a set of clauses A" added to the current witness policy candidate A' such that, for the selected probe $\pi$ from $\Pi^+$, $A' \cup A" \vdash \pi$.

In general, A" may contain the body atoms of just a subset of $\tilde{A}$'s clauses, and the heads belonging to these clauses combine with clauses in A" to make the body atoms of other clauses in $\tilde{A}$ true; this oscillatory back and forth between A" and $\tilde{A}$ continues until the query of the selected probe $\pi$ is true.

More formally, a witness policy extension A" can be found as follows. $\tilde{A}$ comprises n clauses, each of which is of the form $P_0 \leftarrow P_1, \ldots, P_n$, where $P_1$ refers to the first position in the clause body, $P_2$ refers to the second position in the clause body, etc. For a given permutation of clauses from $\tilde{A}$, denoted $\langle a_1, \ldots, a_n \rangle$ the body atoms are extracted from each clause and placed in a set $\vec{P}_i$. In other words, $\forall i \in \{1, \ldots, n\}$: $\vec{P}_i = bd(a_i)$. This defines $\vec{P}_1$ to $\vec{P}_n$. $\vec{P}_{n+1}$ is set to $\vec{P}_{n+1} = \vec{P}$, where $\vec{P}$ is the set of atoms of the query of the selected probe $\pi$ from $\Pi^+$.

Then, to construct A", iterating through k=1 to n, for each $P_k \in \vec{P}_k$, A" contains the clause $P_k \leftarrow hds(\{a_1, a_{k-1}\})$. For example, for each $P_1 \in \vec{P}_1$, A" contains $P_1$, for each $P_2 \in \vec{P}_2$, A" contains the clause $P_2 \leftarrow hd(a_1)$, and for each $P_3 \in \vec{P}_3$, A" contains the clause $P_3 \leftarrow hd(a_1), hd(a_2)$. In addition, for each $P_{n+1} \in \vec{P}_{n+1}$ A" contains the clause $P_{n+1} hds(\{a_1, \ldots, a_n\})$. Overall, the generation of witness policy extension A" can be expressed as:

$$A" = \cup_{k=1}^{n+1} \cup_{P_k \in \vec{P}_k} \{P_k \leftarrow hds(\{a_1, \ldots, a_{k-}\})\}$$

Once a witness policy extension has been generated for each of the permutations of $\tilde{A}$, the union of the current witness policy candidate and each of the witness policy extensions, $A' \cup A"$, is found, and it is determined 510 whether all the probes in the negative probe set $\Pi^-$ are still negative for at least one of these witness policy extensions. In other words, for a each A" it is determined if $\forall \pi \in \Pi^-: A' \cup A" \not\vdash \pi$.

If it is determined 510 that none of these witness policy extensions give negative results for all the probes in the negative probe set, then this means that the current search branch for a witness policy extension has ended without successfully finding one. The algorithm checks 512 whether more subsets $\tilde{A}$ remain to be tried. If so, then the algorithm backtracks and tries another $\tilde{A} \subseteq A$. If not, then this means all subsets have been tried, and the algorithm has not been able to find a witness policy that is observationally equivalent to the policy from the selected initial state. It is determined 513 whether more initial states are available in Init that have not yet been tried. If so, then another initial state is selected and the process repeats. If not, then the algorithm outputs 514 an indication that the test probe is detectable in the policy.

Conversely, if it is determined 510 that at least one of the witness policy extensions does give negative results for all the probes in the negative probe set, then this means that the witness policy extension can be added to the witness candidate whilst still being observationally equivalent to the policy.

Responsive to this the selected probe π is removed from Π⁺, and the current witness candidate is updated to include the witness policy extension, i.e. A'=A'∪A". This can be more formally represented by the transition:

$$\langle \Pi^+ \cup \{\langle A, \wedge \vec{P}\rangle\}, \Pi^-, A'\rangle \xrightarrow{\langle A, \wedge \vec{P}\rangle} \langle \Pi^+, \Pi^-, A' \cup A''\rangle$$

It is then determined 518 whether the set of positive probes Π⁺ is empty, i.e. the state ⟨∅, Π⁻, A'₀⟩ has been reached. If not, then another probe from Π⁺ is selected, and the process repeats. Conversely, if so, then this means that a witness candidate A'₀, has been found that is observationally equivalent to the policy A₀, and hence an indication that the test probe is opaque in the policy is output 520.

The process shown in FIG. 5 can also be arranged to find more than one witnesses policy (if multiples ones exist). For example, when there are a plurality of witness policy extensions that are determined 510 to make all the probes in Π⁻, these can be stored and the process completed for all of them to decide if they result in a witness policy. In such an arrangement, the output is then a list of witness policies, as well as the indication that the test probe is opaque.

Formally, the algorithms of FIGS. 4 and 5 can be represented by the state transition system shown below:

$$\text{(INIT)} \frac{(\Pi^+, \Pi^-) \in \text{flatten}_{A_0}(\text{Avail})\ \pi_0 = \langle A, \varphi\rangle\ (S^+, S^-) \in \text{dnf}(\neg\varphi)\quad \forall\ \pi \in \Pi^- \cup \{\langle A, \vee S\rangle\}: \text{Visible}(A_0) \nvdash \pi}{\langle \Pi^+ \cup \{\langle A, \wedge S^+\rangle\}, \Pi^- \cup \{\langle A, \vee S^-\rangle\}, \text{Visible}(A_0)\rangle \in \text{Init}}$$

$$\text{(PROBE)} \frac{\tilde{A} \subseteq A\ \langle a_1, \ldots, a_n\rangle \in \text{perms}(\tilde{A})\ \forall\ i \in \{1, \ldots, n\}: \vec{P}_i = bd(a_i)\quad \vec{P}_{n+1} = \vec{P}\ A'' = \bigcup_{k=1}^{n+1}\bigcup_{P_k \leftarrow \vec{P}_k}\{P_k \leftarrow hds(\{a_1, \ldots, a_{k-1}\})\}\quad \forall\ \pi \in \Pi^-: A' \cup A'' \nvdash \pi}{\langle \Pi^+ \cup \{\langle A, \wedge \vec{P}\rangle\}, \Pi^-, A'\rangle \xrightarrow{\langle A, \wedge \vec{P}\rangle} \langle \Pi^+, \Pi^-, A' \cup A''\rangle}$$

The process outlined above with reference to FIGS. 4 and 5 can be further explained with a simple illustrative example. Consider an example policy A₀={q.,s.,v.,z←p, r, u.}, which has no public part, i.e., Visible(A₀)=∅, and it is desired to know whether a test probe π₀=⟨∅, q∨s⟩ is detectable in the policy. The attacker has a set of available probes defined by Avail={⟨(A', z⟩ |A' ⊆ A} where A={p←q.,r←s.,u←v.}. In other words, the set of available probes comprises a plurality of probes, all having the same query z, but having different credentials sets equal to or being subsets of A.

First, the set of initial states is computed. π=⟨A,z⟩ is the only probe from Avail that is positive in A₀. For all other available probes π'∈ Avail, A₀ ⊬ π'. Since the queries in the available probes do not involve disjunctions (they are all equal to z), flatten$_{A_0}$ (Avail) contains only one pair of probe sets ({π}, Avail ∖ {π}). Furthermore, dnf(¬ (q∨s)) also contains only one pair of atom sets (S⁺, S⁻)=(∅, {q, s}). Hence, the set Init contains only one initial state σ₀=⟨Π⁺, Π⁻, ∅⟩, where Π⁺={π} and Π⁻=Avail ∖ {π} ∪{⟨∅,q∨s⟩}.

Starting from σ₀, π is the only probe to be considered, so the algorithm tries out all Ã⊆A. For all the subsets not equal to A, Ã ⊊ A, no witness extensions can be found, as all resulting witness candidates fail to make Π⁻ negative. For Ã=A the algorithm goes through all six permutations of Ã, and constructs and considers the following six witness policy extensions:

A"₁={q.,s←p.,v←p,r.,z←p,r,u.}
A"₂={q.,v←p.,s←p,u.,z←p,r,u.}
A"₃={s.,q←r.,v←p,r.,z←p,r,u.}
A"₄={S.,V←r.,q←r,u.,z←p,r,u.}
A"₅={v.,q←u.,s←p,u.,z←p,r,u.}
A"₆={v.,s←u.,q←r,u.,z←p,r,u.}

Only two of these pass the negative probe test; one final state is ⟨∅, Π⁻, A"₆⟩, and hence π₀ is opaque.

The algorithm presented above can also be enhanced in several ways, in order to reduce the computational complexity in searching for witness policies. For example, The order in which the probes in Π⁺ are processed is irrelevant, since the constructed witness policy extension is independent of the current witness policy candidate; it only depends on the currently considered probe. Therefore, an evaluation sequence can be preselected for Π⁺ in an initial state, thereby reducing the search space by a factor of |Π⁺|! for the search branch starting from that initial state, such that fewer iterations are performed.

In another example, the set of positive probes and the set of negative probes can be analyzed for a pair of redundant probes that produce a matching result. Such redundant probes can be removed. For example, the sets Π⁺ and Π⁻ in an initial state may contain pairs of probes π₁=⟨A₁, φ₁⟩, π₂=⟨A₂, φ₂⟩ such that π₁⊆π₂ (i.e., φ₁=φ₂∧A₁⊆A₂). By monotonicity of ⊢ and of the query z, one of the queries is redundant, since any witness candidate that makes π₁ positive also makes π₂ positive. A similar argument can be made for the probes in Π⁻. In general, initial states can first be transformed into smaller states ⟨Π₁⁺, Π₁⁻, A⟩ where Π₁⁻={π∈Π₀⁺|¬ ∃π'∈Π₀⁺: π⊊π'} and Π₁⁻= {π∈Π₀⁻|¬ ∃π'∈Π₀⁻: π⊊π'}. These reduced states can then be used as initial states.

In a further example, the initial states can be analyzed to determine whether a probe in the set of positive probes is a subset of or equal to a probe in the set of negative probes, and, if so, it can determining without performing the rest of the algorithm that that at least one witness policy cannot be generated.

As noted above, the presented algorithms for determining if a probe is detectable in a policy can be implemented on a computing device such as 122 in FIG. 1. The computing device 122 can be connected to a display device, and arranged to present a user interface to an administrator or analyst of the policy. The user interface can be used to input the data regarding the policy, such as one or more of the test probes, the visible portion, the available probes and the policy to be tested.

The user interface can also be used to present the results to the administrator/analyst. For example, the user interface can display the indication of whether the test probe is detectable or not, as well as present a list of one or more witness policies (if available). This enables the user to view the witness policies, and determine whether they sufficiently improbable that they do not provide confidence in opacity in practice. In such cases, the user interface can provide the user with the option to skip a witness policy and continue searching for other witness policies that are observationally equivalent.

Figure 6:
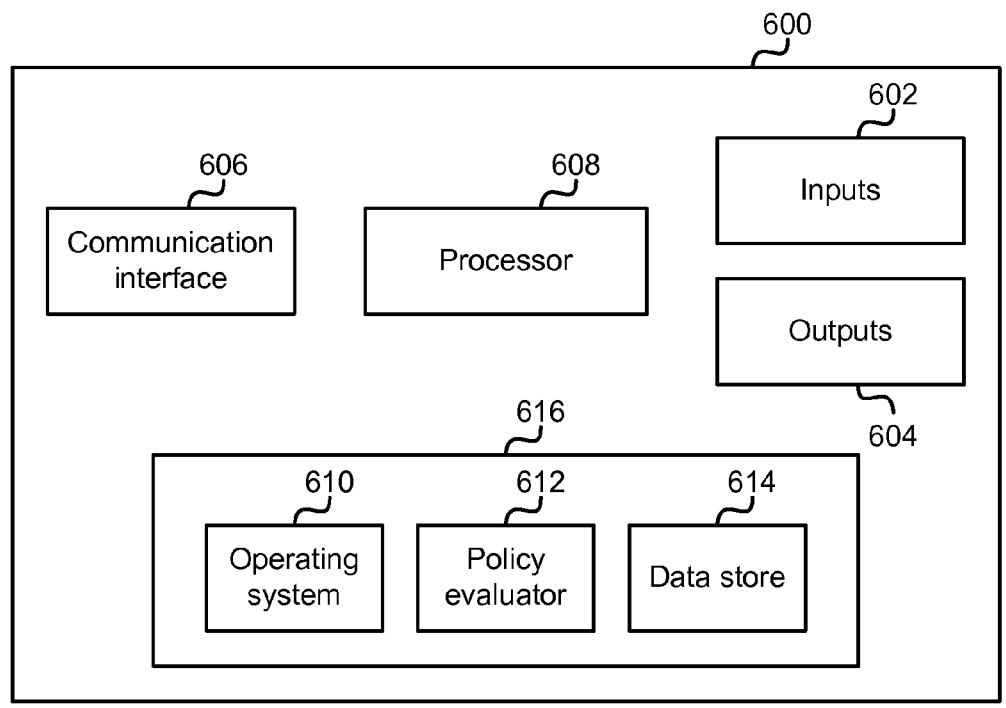
FIG. 6 illustrates an exemplary computing-based device in which embodiments of the delegation-based authorization may be implemented.

Reference is now made to FIG. 6, which illustrates various components of an exemplary computing device 600 which can be implemented as any form of a computing and/or electronic device, and in which embodiments of the delegation-based authorization can be implemented. The exemplary computing device 600 can for example implement the automated algorithm for determining detectability in a policy.

The computing device 600 comprises at least one input interface 602 which is of any suitable type for receiving input such as from a user interaction device, such as a keyboard, mouse, touch sensitive device, etc. and can be used to receive data on the policy and the test probe. Such data can also be received remotely via other types of input interface, such as communication interface 606 which is suitable for communicating with other elements of the authorization system, such as the reference monitor 114, authorization node 116, or any other remote computing device via one or more communication networks. An output interface 604 is also provided such as data and/or video output to display device, storage device or other computing device in communication with the computing device 600. The output can provide a graphical user interface, or other user interface of any suitable type as noted above.

Computing device 600 also comprises one or more processors 608 which can be microprocessors, controllers or any other suitable type of processors for processing computing executable instructions to control the operation of the device in order to evaluate the authorization policy. In some examples, for example where a system on a chip architecture is used, the processors 608 may include one or more fixed function blocks (also referred to as accelerators) which implement a part of the method in hardware (rather than software or firmware).

Platform software comprising an operating system 610 or any other suitable platform software can be provided at the computing-based device 600 to enable policy evaluator software 612 to be executed on the device. The policy evaluator software 612 can comprise the above-described process for evaluating whether a probe is detectable in a policy. A data store 614 can be provided to store the authorization policy, test probe, etc. and other data such as intermediate results.

The computer executable instructions may be provided using any computer-readable media that is accessible by computing device 600. Computer-readable media may include, for example, computer storage media such as memory 616 and communications media. Computer storage media, such as memory 616, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 616) is shown within the computing device 600 it will be appreciated that the storage may be distributed or located remotely and accessed via a network or other communication link (e.g. using communication interface 606).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of evaluating detectability of a confidential property of an authorization policy, comprising:
   receiving a test probe for the confidential property, wherein the confidential property is defined by whether application of the test probe to the authorization policy generates an access grant result;
   determining, using a processor, whether at least one witness policy can be generated that is observationally equivalent to the authorization policy, but the application of the test probe to the witness policy generates an access denial result, the determining comprising:
      receiving a set of available probes, each probe comprising at least a set of clauses;
      determining which of the probes in the set of available probes are positive and which of the probes are negative when the probes are applied to the authorization policy;
      converting the negative probes into positive probes using negation;
      breaking up the positive and negated probes at disjunctions to create disjuncts of atoms and negated atoms;
      creating a pair of sets of positive and negated atoms for each disjunction in the set of available probes where the positive atoms are added to one set and the negated atoms are added to the other set;
      negating the test probe;
      generating a disjunctive normal form of the test probe;
      generating a set of initial states comprising triples, each triple comprising:
         a set of probes that have to be positive in the witness policy, the set being formed by adding a set of positive test atoms to the set of positive atoms derived from the list of available probes;
         a set of probes that have to be negative in the witness policy, the set being formed by adding a set of negated test atoms to the set of negated atoms derived from the list of available probes; and,
         an initial witness policy candidate comprising a visible portion;
      evaluating each of the set of initial states, the evaluation comprising:
         selecting a positive probe from the set of probes that have to be positive in the witness policy;
         calculating all permutations of the clauses associated with the selected positive probe;
         generating a witness policy extension for each calculated permutation;
         finding a union of each witness policy extension and the initial witness policy candidate;
         determining whether each of the set of probes that have to be negative in the witness policy are negative for any of the unions of the witness policy extensions and the initial witness policy candidate;
         adding to the initial witness policy candidate any witness policy extension associated with a probe that is negative for the union of the initial witness policy candidate and the witness policy extension; and
         repeating the evaluation for each positive probe from the set of probes that have to remain positive in the witness policy.

2. A method according to claim 1 further comprising, in a case that at least one witness policy can be generated, outputting an indication that the confidential property cannot be detected using the test probe, and, in a case that at least one witness policy cannot be generated, outputting an indication that the confidential property can be detected using the test probe.

3. A method according to claim 2 further comprising displaying, at a display device, the indication that the confidential property cannot be detected or the indication that the confidential property can be detected to a user.

4. A method according to claim 1 further comprising selecting an evaluation sequence for the set of positive probes prior to iterating through each probe in the set of positive probes, such that fewer iterations are performed than would have been performed if the evaluation sequence had not been selected.

5. A method according to claim 1 further comprising analyzing the set of positive probes and the set of negative probes for a pair of redundant probes that produce a matching result, and removing one of these redundant probes.

6. A method according to claim 1, wherein the step of determining whether at least one witness policy can be generated comprises analyzing the set of positive probes and the set of negative probes to determine whether a probe in the set of positive probes is a subset of or equal to a probe in the set of negative probes, and, if so, determining that that at least one witness policy cannot be generated.

7. A method according to claim 1 further comprising displaying, at a display device, a list of witness policies and receiving, at a user interface, an input from a user indicating whether or not to skip each of the listed witness policies.

8. One or more computer storage media with device-executable instructions that, when executed by a computing system, direct the computing system to perform steps comprising:
   receiving a test probe for the confidential property, wherein the confidential property is defined by whether application of the test probe to the authorization policy generates an access grant result;
   determining, using a processor, whether at least one witness policy can be generated that is observationally equivalent to the authorization policy, but the application of the test probe to the witness policy generates an access denial result, the determining comprising:
      receiving a set of available probes, each probe comprising at least a set of clauses;
      determining which of the probes in the set of available probes are positive and which of the probes are negative when the probes are applied to the authorization policy;
      converting the negative probes into positive probes using negation;
      breaking up the positive and negated probes at disjunctions to create disjuncts of atoms and negated atoms;
      creating a pair of sets of positive and negated atoms for each disjunction in the set of available probes where the positive atoms are added to one set and the negated atoms are added to the other set;
      negating the test probe;
      generating a disjunctive normal form of the test probe;
      generating a set of initial states comprising triples, each triple comprising:

a set of probes that have to be positive in the witness policy, the set being formed by adding a set of positive test atoms to the set of positive atoms derived from the list of available probes;

a set of probes that have to be negative in the witness policy, the set being formed by adding a set of negated test atoms to the set of negated atoms derived from the list of available probes; and, an initial witness policy candidate comprising a visible portion;

evaluating each of the set of initial states, the evaluation comprising:

selecting a positive probe from the set of probes that have to be positive in the witness policy;

calculating all permutations of the clauses associated with the selected positive probe;

generating a witness policy extension for each calculated permutation;

finding a union of each witness policy extension and the initial witness policy candidate;

determining whether each of the set of probes that have to be negative in the witness policy are negative for any of the unions of the witness policy extensions and the initial witness policy candidate;

adding to the initial witness policy candidate any witness policy extension associated with a probe that is negative for the union of the initial witness policy candidate and the witness policy extension; and repeating the evaluation for each positive probe from the set of probes that have to remain positive in the witness policy.

9. One or more computer storage media according to claim 8 storing instructions further comprising, in a case that at least one witness policy can be generated, outputting an indication that the confidential property cannot be detected using the test probe, and, in a case that at least one witness policy cannot be generated, outputting an indication that the confidential property can be detected using the test probe.

10. One or more computer storage media according to claim 9 storing instructions further comprising displaying, at a display device, the indication that the confidential property cannot be detected or the indication that the confidential property can be detected to a user.

11. One or more computer storage media according to claim 8 storing instructions further comprising selecting an evaluation sequence for the set of positive probes prior to iterating through each probe in the set of positive probes, such that fewer iterations are performed than would have been performed if the evaluation sequence had not been selected.

12. One or more computer storage media according to claim 8 storing instructions further comprising analyzing the set of positive probes and the set of negative probes for a pair of redundant probes that produce a matching result, and removing one of these redundant probes.

13. One or more computer storage media according to claim 8, wherein the step of determining whether at least one witness policy can be generated comprises analyzing the set of positive probes and the set of negative probes to determine whether a probe in the set of positive probes is a subset of or equal to a probe in the set of negative probes, and, if so, determining that that at least one witness policy cannot be generated.

14. One or more computer storage media according to claim 8 storing instructions further comprising displaying, at a display device, a list of witness policies and receiving, at a user interface, an input from a user indicating whether or not to skip each of the listed witness policies.

15. An apparatus comprising:

an input interface arranged to receive an authorization policy having a confidential property and a test probe for the confidential property, wherein the confidential property is defined by whether application of the test probe to the authorization policy generates an access grant result;

a data store arranged to store the authorization policy and the test probe;

an output interface; and a processor, the processor being hardware, arranged for determining whether at least one witness policy can be generated that is observationally equivalent to the authorization policy, but the application of the test probe to the witness policy generates an access denial result, the determining comprising:

receiving a set of available probes, each probe comprising at least a set of clauses;

determining which of the probes in the set of available probes are positive and which of the probes are negative when the probes are applied to the authorization policy;

converting the negative probes into positive probes using negation;

breaking up the positive and negated probes at disjunctions to create disjuncts of atoms and negated atoms;

creating a pair of sets of positive and negated atoms for each disjunction in the set of available probes where the positive atoms are added to one set and the negated atoms are added to the other set;

negating the test probe;

generating a disjunctive normal form of the test probe;

generating a set of initial states comprising triples, each triple comprising:

a set of probes that have to be positive in the witness policy, the set being formed by adding a set of positive test atoms to the set of positive atoms derived from the list of available probes;

a set of probes that have to be negative in the witness policy, the set being formed by adding a set of negated test atoms to the set of negated atoms derived from the list of available probes; and, an initial witness policy candidate comprising a visible portion;

evaluating each of the set of initial states, the evaluation comprising:

selecting a positive probe from the set of probes that have to be positive in the witness policy;

calculating all permutations of the clauses associated with the selected positive probe;

generating a witness policy extension for each calculated permutation;

finding a union of each witness policy extension and the initial witness policy candidate;

determining whether each of the set of probes that have to be negative in the witness policy are negative for any of the unions of the witness policy extensions and the initial witness policy candidate;

adding to the initial witness policy candidate any witness policy extension associated with a probe that is negative for the union of the initial witness policy candidate and the witness policy extension; and repeating the evaluation for each positive probe from the set of probes that have to remain positive in the witness policy.

16. An apparatus according to claim 15 further comprising, in a case that at least one witness policy can be generated, outputting an indication that the confidential property cannot be detected using the test probe, and, in a case that at least one witness policy cannot be generated, outputting an indication that the confidential property can be detected using the test probe.

17. An apparatus according to claim 16 further comprising displaying, at a display device, the indication that the confidential property cannot be detected or the indication that the confidential property can be detected to a user.

18. An apparatus according to claim 15 further comprising selecting an evaluation sequence for the set of positive probes prior to iterating through each probe in the set of positive probes, such that fewer iterations are performed than would have been performed if the evaluation sequence had not been selected.

19. An apparatus according to claim 15 further comprising analyzing the set of positive probes and the set of negative probes for a pair of redundant probes that produce a matching result, and removing one of these redundant probes.

20. An apparatus according to claim 15, wherein the step of determining whether at least one witness policy can be generated comprises analyzing the set of positive probes and the set of negative probes to determine whether a probe in the set of positive probes is a subset of or equal to a probe in the set of negative probes, and, if so, determining that that at least one witness policy cannot be generated.

* * * * *